United States Patent
Sekiguchi et al.

(10) Patent No.: US 10,972,042 B2
(45) Date of Patent: Apr. 6, 2021

(54) ELECTRIC-MOTOR CONTROL APPARATUS

(71) Applicant: Mitsubishi Electric Corporation, Chiyoda-ku (JP)

(72) Inventors: Hiroyuki Sekiguchi, Tokyo (JP); Naoto Takano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 293 days.

(21) Appl. No.: 16/320,115

(22) PCT Filed: Sep. 13, 2017

(86) PCT No.: PCT/JP2017/033120
§ 371 (c)(1),
(2) Date: Jan. 24, 2019

(87) PCT Pub. No.: WO2018/193649
PCT Pub. Date: Oct. 25, 2018

(65) Prior Publication Data
US 2019/0267927 A1  Aug. 29, 2019

(30) Foreign Application Priority Data
Apr. 20, 2017 (JP) .............................. JP2017-083315

(51) Int. Cl.
*H02P 29/40* (2016.01)
(52) U.S. Cl.
CPC .................................... *H02P 29/40* (2016.02)
(58) Field of Classification Search
CPC .... H02P 29/40; H02P 4/00; H02P 5/00; H02P 5/753; H02P 5/485; H02P 1/00;
(Continued)

(56) References Cited

U.S. PATENT DOCUMENTS

| 2010/0095787 A1* | 4/2010 | Murphy | ................. B60R 22/48 |
| | | | 73/862.391 |
| 2013/0166064 A1 | 6/2013 | Maki et al. | |

FOREIGN PATENT DOCUMENTS

| JP | 2006-256067 A | 9/2006 |
| JP | 2013-71536 A | 4/2013 |
| JP | 2013-133192 A | 7/2013 |

OTHER PUBLICATIONS

International Search Report dated Dec. 19, 2017 in PCT/JP2017/033120 filed on Sep. 13, 2017.

* cited by examiner

*Primary Examiner* — Antony M Paul
(74) *Attorney, Agent, or Firm* — Xsensus LLP

(57) ABSTRACT

An electric-motor control apparatus includes: a command generation unit; a drive detector; a drive-current detection unit; a current-control computation unit; a steady-state-load calculation unit; a first steady-state-load reference-value storage unit; and a tension-variation analysis unit. The command generation unit outputs a drive command signal of an electric motor; the drive detector outputs a drive detection signal of the electric motor; the control computation unit receives the drive detection signal and the drive command signal and outputs a current command value; the drive-current detection unit outputs a drive-current detection value; the current-control computation unit outputs the drive current to the electric motor; and the steady-state-load calculation unit outputs a steady-state-load calculation value. The first steady-state-load reference-value storage unit stores a first steady-state-load reference value; and the tension-variation analysis unit outputs a tension-variation analysis value.

8 Claims, 9 Drawing Sheets

(58) Field of Classification Search
CPC .... H02P 1/04; H02P 1/166; H02P 1/24; H02P 1/26; H02P 1/18; H02P 1/163; H02P 1/42; H02P 1/465; H02P 1/50; H02P 1/54; H02P 3/00; H02P 6/00; H02P 6/007; H02P 6/04; H02P 6/08; H02P 6/14; H02P 6/28; H02P 21/00; H02P 21/003; H02P 21/20; H02P 23/00; H02P 23/0027; H02P 23/14; H02P 23/20; H02P 27/00; H02P 27/04; H02P 27/06; H02P 27/045; F16H 1/00; F16H 3/126; F16H 7/08; F16H 2007/0842; F16H 55/36; B21B 38/06; B60R 21/0155; B60R 2022/4609; B60R 2022/4614
See application file for complete search history.

ELECTRIC-MOTOR CONTROL APPARATUS

FIELD

The present invention relates to an electric-motor control apparatus that drives a drive mechanism that uses a belt.

BACKGROUND

In a machine apparatus that includes a drive mechanism that uses a belt, the belt may be stretched and thereby decreases in installation tension, thus causing reduction in friction between the belt and a pulley and thereby a slip between the belt and the pulley. When the belt is a toothed belt, the decrease in installation tension of the belt causes a phenomenon called a tooth skipping between the toothed belt and the pulley. A slip or a tooth skipping caused between the belt and the pulley may lead to reduction in efficiency of power transmission and degradation in synchronism between the input side and the output side.

The degradation in synchronism due to a slip or a skipping caused between the belt and the pulley poses a significant problem for apparatuses such as industrial apparatuses that require accuracy; thus, appropriate installation tension of the belt needs to be maintained. To maintain an appropriate installation tension of the belt, the installation tension of the belt needs to be measured regularly. Interrupting a machine apparatus in order to measure the tension regularly, however, reduces the operation hours; thus, there is a demand for a function to measure the tension during the operation of a machine apparatus.

An electric booster is disclosed in Patent Literature 1, in which elastic deformation of a support portion of a bearing on which installation tension of a belt acts as a radial load is measured, using a strain sensor attached on the support portion, and used to estimate the installation tension of the belt, and, when the estimated tension is equal to or less than a threshold value, an abnormal tension reduction is detected.

A pressure control method for an electric injection molding machine is disclosed in Patent Literature 2, in which a screw angular velocity, belt tension, and a resin pressure are estimated, for use in pressure control of the resin, using an observer from an angular velocity and a torque command of a motor that drives the screw of the injection molding machine via a belt transfer mechanism.

A conveying apparatus is disclosed in Patent Literature 3, in which an anomaly is detected by detecting belt tension that acts on a dependent-side pulley.

CITATION LIST

Patent Literature

Patent Literature 1: Japanese Patent Application Laid-open No. 2013-71536
Patent Literature 2: Japanese Patent Application Laid-open No. 2006-256067
Patent Literature 3: Japanese Patent Application Laid-open No. 2013-133192

SUMMARY

Technical Problem

The electric booster disclosed in Patent Literature 1 requires not only the addition of the strain sensor for estimating the installation tension of the belt but also an installation location for the sensor and wiring for acquiring a sensor measurement value.

The pressure control method disclosed in Patent Literature 2 necessitates measuring and setting values in advance such as a spring constant and kinetic frictional resistance of the belt for the estimation using the observer. Furthermore, the pressure control method disclosed in Patent Literature 2 is not appropriate for the purpose of detecting an anomaly in installation tension of the belt because the tension of the belt cannot be estimated when the spring constant of the belt is changed over years.

Patent Literature 3, in which the conveying apparatus is disclosed, describes only that the apparatus has the function of detecting an anomaly from the belt tension, but does not disclose a specific method with which the anomaly detection is achieved.

The present invention has been achieved in view of the above, and an object of the present invention is to provide an electric-motor control apparatus capable of measuring a change in installation tension of a belt without addition of a sensor or measuring and setting of a belt characteristic in advance.

Solution to Problem

To solve the problems described above and achieve the object described above, the present invention provides an electric-motor control apparatus that controls an electric motor that is a driving source in a drive unit that transfers torque from the driving source to a load by using a belt, the electric-motor control apparatus includes: a command generation unit that outputs a drive command signal that indicates desired values of an angle, of an angular velocity, or of an angular acceleration of the electric motor; a drive detector that outputs a drive detection signal that indicates values of the angle, of the angular velocity, or of the angular acceleration of the electric motor; and a control computation unit that receives the drive detection signal and the drive command signal, and outputs a current command value that is a desired value of a drive current to be supplied to the electric motor. The present invention includes: a drive-current detection unit that outputs a drive-current detection value that is a value of the drive current; a current-control computation unit that receives the current command value and the drive-current detection value and outputs the drive current to the electric motor; a steady-state-load calculation unit that receives the drive-current detection value or the current command value, and the drive detection signal and outputs a steady-state-load calculation value that indicates a magnitude of a steady-state load applied to the electric motor; a first steady-state-load reference-value storage unit that stores a first steady-state-load reference value that is a reference value of the steady-state load applied to the electric motor; and a tension-variation analysis unit that outputs a tension-variation analysis value that indicates a state of installation tension of the belt on a basis of a comparison between the steady-state-load calculation value and the first steady-state-load reference value.

Advantageous Effects of Invention

The present invention produces an effect capable of measuring a change in installation tension of a belt from velocity and torque values of an electric motor without addition of a sensor or measuring and setting of a belt characteristic in advance.

DESCRIPTION OF EMBODIMENTS

Exemplary embodiments of an electric-motor control apparatus according to the present invention will be described in detail below with reference to the drawings. The present invention is not limited to the embodiments.

First Embodiment

Figure 1:
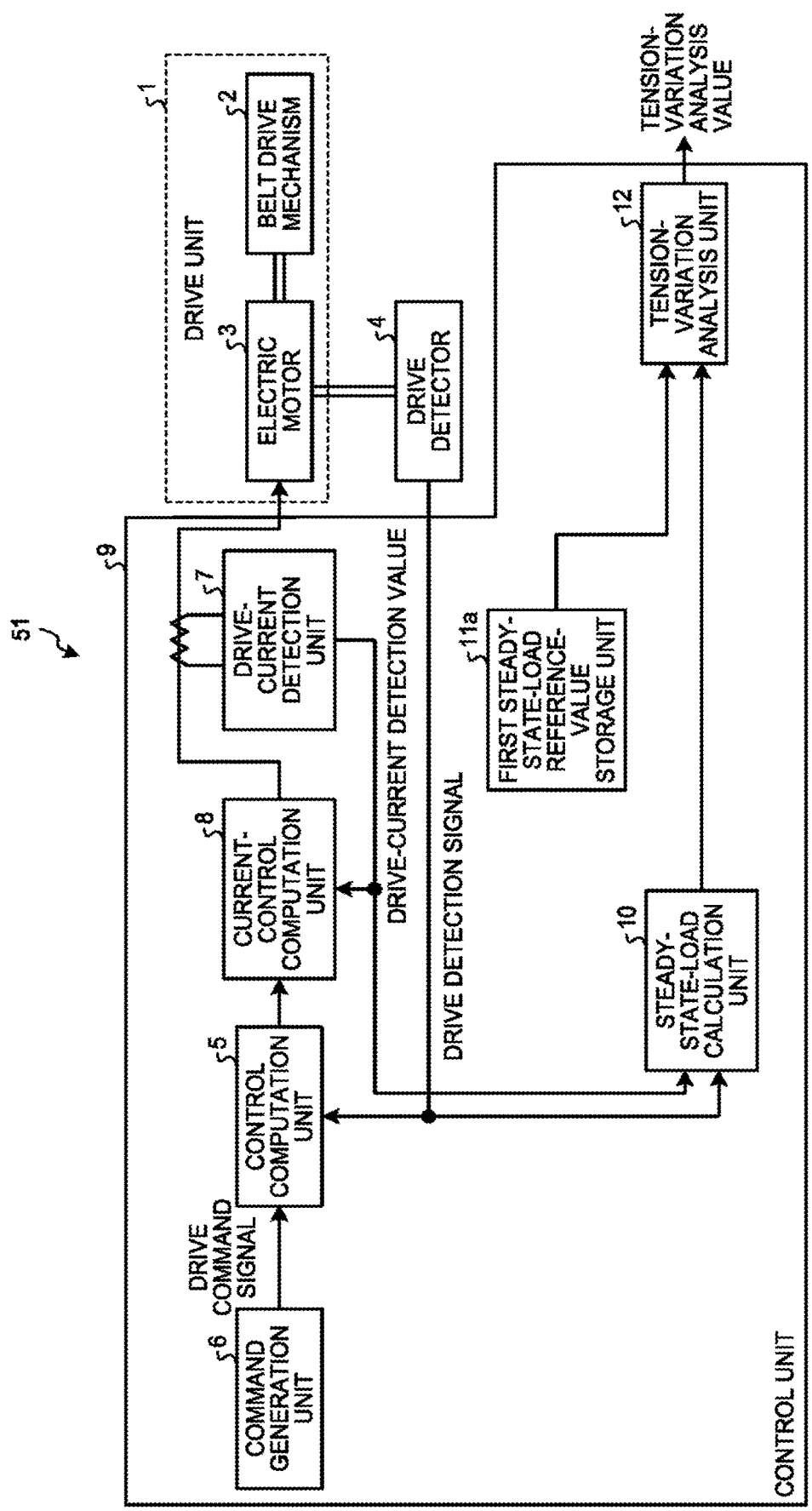
FIG. 1 is a block diagram illustrating a configuration of an electric-motor control apparatus according to a first embodiment of the present invention.

FIG. 1 is a block diagram illustrating a configuration of an electric-motor control apparatus according to a first embodiment of the present invention. An electric-motor control apparatus 51 according to the first embodiment includes: a drive unit 1 that includes an electric motor 3 that is a driving source and a belt drive mechanism 2 that is mechanically coupled to the electric motor 3; a drive detector 4 that detects an angle of the electric motor 3; and a control unit 9 that controls the electric motor 3.

The electric motor 3 generates torque from an applied drive current and drives the belt drive mechanism 2.

The drive detector 4 detects an angle of the electric motor 3 and outputs a drive detection signal that indicates a measurement value of the angle of the electric motor 3.

The control unit 9 includes: a command generation unit 6 that outputs a drive command signal that indicates a desired value of the angle of the electric motor 3; a control computation unit 5 that calculates a current command value that is a desired value of a magnitude of a drive current to be supplied to the electric motor 3 such that the drive detection signal follows the drive command signal output from the command generation unit 6; a drive-current detection unit 7 that detects a drive current applied to the electric motor 3 and outputs a drive-current detection value that is a measurement value of the drive current; a current-control computation unit 8 that applies the drive current to the electric motor 3 such that the drive-current detection value follows the current command value; a steady-state-load calculation unit 10 that calculates a steady-state-load calculation value that indicates a magnitude of a steady-state load applied to the electric motor 3 from the drive detection signal and the drive-current detection value; a first steady-state-load reference-value storage unit 11a that stores a first steady-state-load reference value that is a reference value of a steady-state load applied to the electric motor 3; and a tension-variation analysis unit 12 that outputs a tension-variation analysis value that is a value based on a comparison between the steady-state-load calculation value and the first steady-state-load reference value.

An operation of the electric-motor control apparatus 51 illustrated in FIG. 1 will be described next. The control computation unit 5 calculates the current command value such that a difference between the drive command signal output from the command generation unit 6 and the drive detection signal output from the drive detector 4 approaches zero. The current-control computation unit 8 applies a current to the electric motor 3 such that a difference between the current command value and the drive-current detection value output from the drive-current detection unit 7 approaches zero. The electric motor 3 generates torque that corresponds to the applied current and drives the drive unit 1 which includes the belt drive mechanism 2. That is, the control computation unit 5 calculates the magnitude of a current to be applied to the electric motor 3 such that the drive detection signal, which is a result of detection of driving by the electric motor 3 with the torque generated by the electric motor 3, follows the drive command signal.

Figure 2:
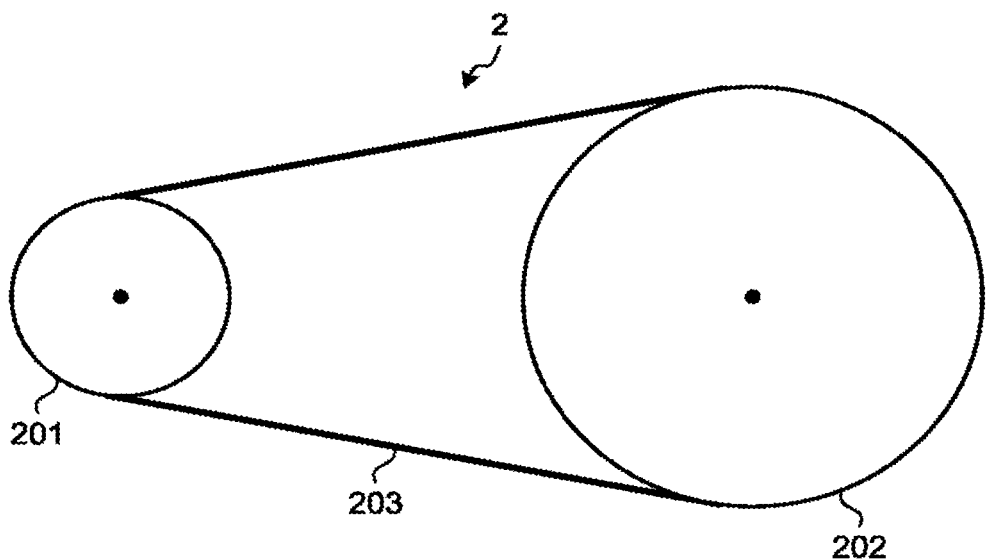
FIG. 2 is a schematic diagram illustrating a configuration of a belt drive mechanism of the electric-motor control apparatus according to the first embodiment.

The belt drive mechanism 2 includes at least two pulleys and a belt having an annular shape. FIG. 2 is a schematic diagram illustrating a configuration of the belt drive mechanism of the electric-motor control apparatus according to the first embodiment. The belt drive mechanism 2 illustrated in FIG. 2 includes a small pulley 201, a large pulley 202, and a belt 203 having an annular shape and placed on outer circumferences of the small pulley 201 and the large pulley 202. The small pulley 201 is mechanically coupled to the electric motor 3, rotating when driven by the electric motor 3. The large pulley 202 is coupled to an undepicted load. The belt 203 transfers the rotation of the small pulley 201 to the large pulley 202, thereby transferring the torque of the electric motor 3 to the load coupled to the large pulley 202. That is, the drive unit 1 transfers torque from the electric motor 3, which is a driving source, to a load by using the small pulley 201, the large pulley 202, and the belt 203.

Minimizing slips between the small pulley 201 and the large pulley 202, and the belt 203 is important to efficiently transfer the torque of the electric motor 3 to the load. If the belt 203 is a toothed belt, a tooth skipping should be eliminated to maintain synchronism between the small pulley 201 and the large pulley 202. To prevent a slip between the small pulley 201 and the large pulley 202, and the belt 203 and a tooth skipping, appropriate installation tension of the belt 203 needs to be maintained.

Figure 3:
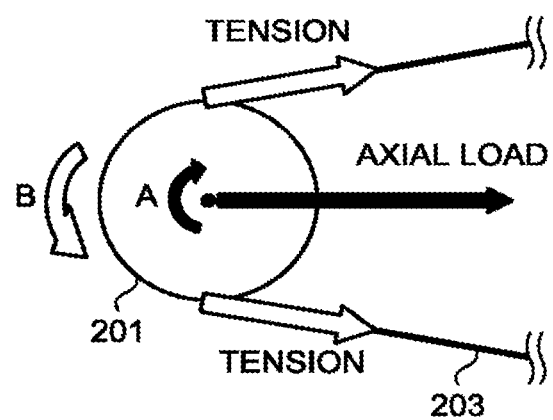
FIG. 3 is a schematic diagram illustrating an effect of installation tension of a belt on a small pulley in the electric-motor control apparatus according to the first embodiment.

FIG. 3 is a schematic diagram illustrating an effect of the installation tension of the belt on the small pulley in the electric-motor control apparatus according to the first embodiment. The installation tension of the belt 203 acts on the small pulley 201 as a force directed toward the large pulley 202, working as an axial load on a shaft of the electric motor 3, which also serves as a rotation shaft of the small pulley 201. The shaft of the electric motor 3 presses against a component such as a bearing due to the axial load, and rolling friction is thus increased. When the belt 203 is a toothed belt, resistance caused when the belt 203 engages with the small pulley 201 also varies with the installation tension of the belt 203. Rotational resistance including the rolling friction is caused in a steady state in a direction opposite the rotation direction of the electric motor 3 and the small pulley 201, acting on the electric motor 3. In FIG. 3, an arrow A indicates a direction of rolling friction torque, and an arrow B indicates the rotation direction of the electric motor 3 and the small pulley 201.

The steady-state-load calculation unit 10 calculates the steady-state-load calculation value, which indicates a load acting on the electric motor 3 in the steady state, based on: the drive-current detection value output from the drive-current detection unit 7; and the drive detection signal output from the drive detector 4. Calculation of the steady-state-load calculation value will be described below. Since the electric motor 3 generates torque in correspondence to an applied current, a value of the torque being generated by the electric motor 3 can be obtained from the drive-current detection value. The electric motor 3 generates torque that is a sum total of: acceleration/deceleration torque needed to accelerate/decelerate the drive unit 1 in response to the drive command signal; torque with respect to friction that is caused in the drive unit 1 regardless of the installation tension of the belt 203, such as viscous friction and coulomb friction; and torque with respect to friction that is caused in correspondence to the installation tension. Of these types of torque, the torque with respect to the coulomb friction and the torque with respect to the friction caused in correspondence to the installation tension represent the load that is generated in the steady state.

To obtain the steady-state load, a value of the acceleration/deceleration torque and a value of the torque with respect to the viscous friction which varies with the velocity, need to be subtracted from the torque generated by the electric motor 3. The acceleration/deceleration torque can be calculated from angular acceleration that can be obtained by an operation such as a differentiation operation on the drive detection signal and the moment of inertia of the drive unit 1. A value that combines the torque with respect to the viscous friction and the torque with respect to the steady-state load can be obtained by subtracting the value of the acceleration/deceleration torque from a value of the torque generated by the electric motor 3.

Figure 4:
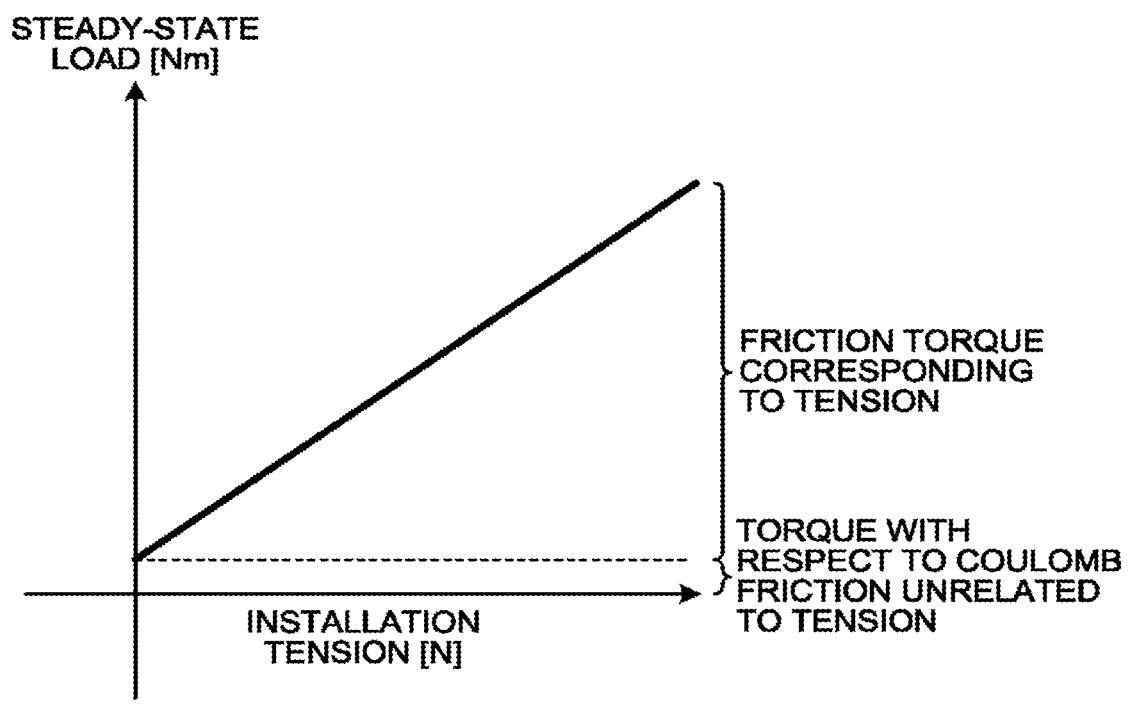
FIG. 4 is a diagram illustrating a relationship between the installation tension of the belt and a steady-state load that acts on an electric motor, in the electric-motor control apparatus according to the first embodiment.

The installation tension of the belt 203 can be thought to be constant in the steady state regardless of the angular velocity of the electric motor 3. The value of the steady-state load can be thus obtained by calculating the value of the torque with respect to the viscous friction, which varies with the angular velocity of the electric motor 3, by using an identification method such as a method of least squares, and then by removing the resultant torque with respect to the viscous friction from the value that combines the torque with respect to the viscous friction and the torque with respect to the steady-state load. The steady-state-load calculation unit 10 outputs the steady-state-load calculation value, which indicates the steady-state load. FIG. 4 is a diagram illustrating a relationship between the installation tension of the belt and the steady-state load, which acts on the electric motor, in the electric-motor control apparatus according to the first embodiment. As illustrated in FIG. 4, a relationship of the friction torque corresponding to the installation tension and friction torque that does not vary with the velocity such as the coulomb friction in the steady-state-load calculation value is such that, as the installation tension increases, the proportion of the friction torque corresponding to the tension increases. If the friction torque corresponding to the installation tension is dominant over the torque with respect to the coulomb friction, a state of the installation tension can be roughly understood from the steady-state-load calculation value.

A steady-state-load reference value that is a value of the steady-state load in a specific state in which the installation tension of the belt 203 can be determined as normal such as when the installation tension of the belt 203 has just been adjusted appropriately is preset as the first steady-state-load reference value, which is stored in the first steady-state-load reference-value storage unit 11a. The tension-variation analysis unit 12 calculates a variation of the steady-state-load calculation value with respect to the steady-state-load reference value based on: the first steady-state-load reference value stored in the first steady-state-load reference-value storage unit 11a; and the steady-state-load calculation value output from the steady-state-load calculation unit 10. Then the tension-variation analysis unit 12 outputs the tension-variation analysis value, which indicates a variation of the steady-state-load calculation value. If the friction torque corresponding to the tension is dominant over the torque with respect to the friction that is independent of the velocity as illustrated in FIG. 4, a variation of the installation tension of the belt 203 can be roughly understood from the proportion of the steady-state-load calculation value with respect to the steady-state-load reference value. While the tension-variation analysis value can be a value that indicates the proportion of a variation of the steady-state-load calculation value from a normal state or a value that indicates the presence of an anomaly on the basis of a comparison between a preset threshold value and a magnitude of a variation, these are not limitations.

The tension-variation analysis unit 12 can: calculate a variation of the steady-state-load calculation value with respect to a normal state from the first steady-state-load reference value stored in the first steady-state-load reference-value storage unit 11a, and the steady-state-load calculation value; and output the tension-variation analysis value, which indicates a state of the installation tension of the belt 203.

In the first embodiment, the first steady-state-load reference value stored in the first steady-state-load reference-value storage unit 11a, is a steady-state load observed when the installation tension of the belt 203 is normal. However, the first steady-state-load reference value may be a steady-state load observed when the installation tension of the belt 203 is anomalous or a steady-state load observed when the installation tension of the belt 203 corresponds to an anomaly threshold value. When the first steady-state-load reference value is a steady-state load observed when the installation tension of the belt 203 is anomalous or a steady-state load observed when the installation tension of the belt 203 corresponds to an anomaly threshold value; the tension-variation analysis unit 12 outputs a tension-variation analysis value that results from determination, with respect to the first steady-state-load reference value, whether the steady-state-load calculation value output from the steadystate-load calculation unit 10 indicates that the installation tension of the belt 203 is anomalous or that the installation tension of the belt 203 corresponds to the anomaly threshold value.

In the first embodiment, the drive detector 4 detects the angle of the electric motor 3 and outputs the drive detection signal. However, the drive detector 4 may detect an angular velocity or an angular acceleration of the electric motor 3, in place of the angle of the electric motor 3, and output the drive detection signal.

Furthermore, an angle, an angular velocity, or an angular acceleration of the small pulley 201 or the large pulley 202 may be detected to output the drive detection signal.

The electric-motor control apparatus according to the first embodiment can measure a change in installation tension of the belt 203 from velocity and torque values of the electric motor 3 without addition of a sensor or measuring and setting of a characteristic of the belt 203 in advance.

Second Embodiment

Figure 5:
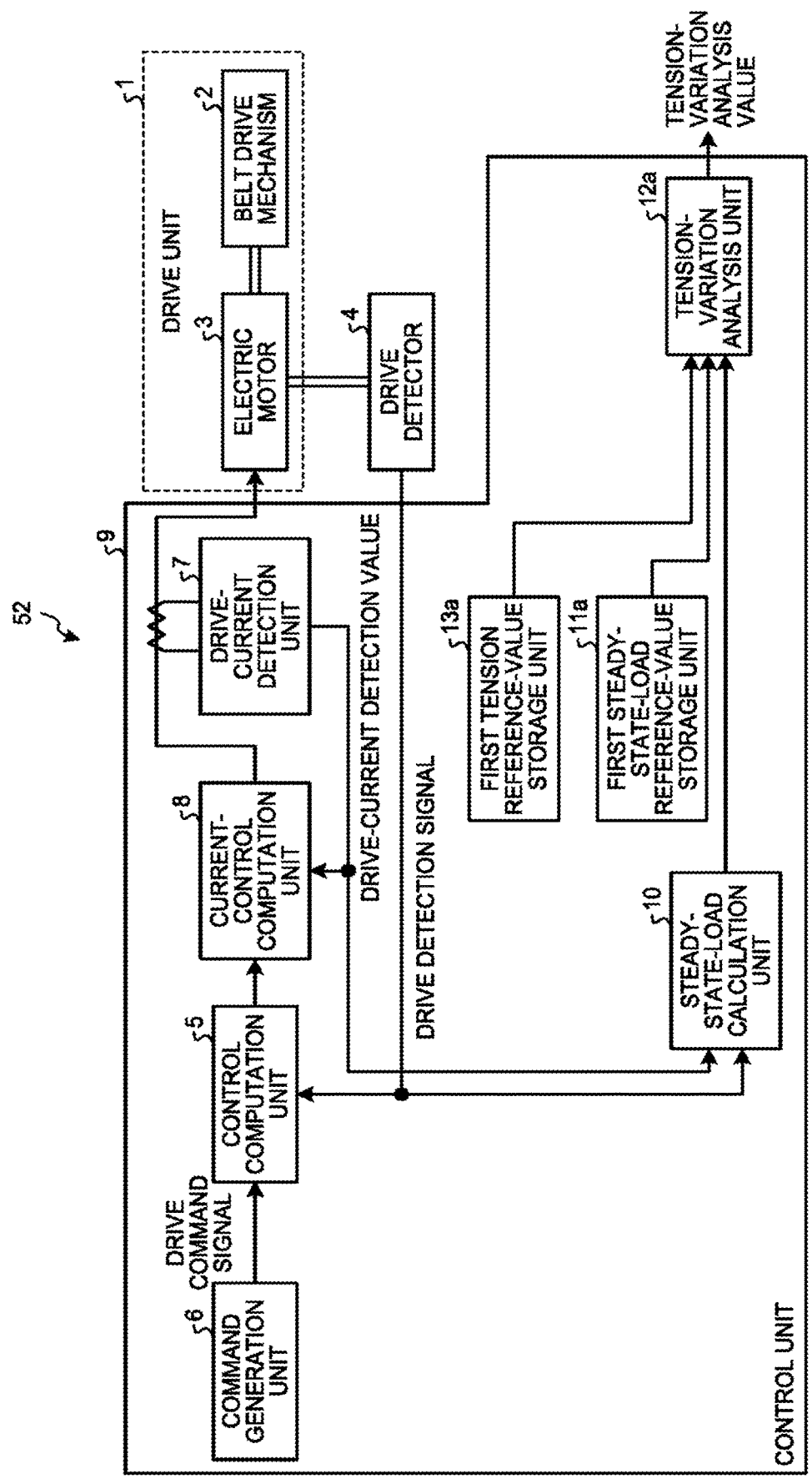
FIG. 5 is a block diagram illustrating a configuration of an electric-motor control apparatus according to a second embodiment of the present invention.

FIG. 5 is a block diagram illustrating a configuration of an electric-motor control apparatus according to a second embodiment of the present invention. An electric-motor control apparatus 52 according to the second embodiment is different from the electric-motor control apparatus 51 according to the first embodiment illustrated in FIG. 1 in that the control unit 9 includes a first tension reference-value storage unit 13a and a tension-variation analysis unit 12a and that the control unit 9 does not include the tension-variation analysis unit 12. The other elements are similar to those in the electric-motor control apparatus 51 according to the first embodiment and are thus designated with identical symbols, and their description is omitted.

A first tension reference value stored in the first tension reference-value storage unit 13a is installation tension of the belt 203 that corresponds to the first steady-state-load reference value stored in the first steady-state-load reference-value storage unit 11a. The tension-variation analysis unit 12a receives the first steady-state-load reference value, the first tension reference value, and the steady-state-load calculation value output from the steady-state-load calculation unit 10. The tension-variation analysis unit 12a calculates installation tension of the belt 203 using a relationship between the first steady-state-load reference value and the first tension reference value, and the steady-state-load calculation value output from the steady-state-load calculation unit 10. The tension-variation analysis unit 12a outputs a tension-variation analysis value based on a value of the calculated installation tension.

A computation performed by the tension-variation analysis unit 12a will be described below. The tension-variation analysis unit 12a performs a computation based on an assumption that, when the installation tension of the belt 203 is zero, the steady-state load is zero. This case corresponds to a state in which the torque for the friction independent of the velocity in FIG. 4 is zero, allowing an assumption that the relationship between the installation tension of the belt 203 and the steady-state-load calculation value is a linear expression in which a constant term is zero. When a constant term of a linear expression is zero, a coefficient can be obtained using a pair of values. A linear expression that expresses the relationship between the installation tension of the belt 203 and the steady-state load can thus be obtained from the first steady-state-load reference value stored in the first steady-state-load reference-value storage unit 11a, and the first tension reference value stored in the first tension reference-value storage unit 13a. Current installation tension of the belt 203 can thus be calculated from the steady-state-load calculation value output from the steady-state-load calculation unit 10, using this linear expression. The tension-variation analysis value output from the tension-variation analysis unit 12a can be a value of calculated installation tension, a value that indicates the proportion of a variation of the installation tension that is calculated from normal installation tension, or a value that indicates presence of an anomaly determined from a comparison with a preset threshold value, however these are not limitations.

As described above, the tension-variation analysis unit 12a can: calculate a linear expression that expresses a relationship between the steady-state load and the installation tension of the belt 203 from the first steady-state-load reference value stored in the first steady-state-load reference-value storage unit 11a, and the first tension reference value stored in the first tension reference-value storage unit 13a; estimate installation tension of the belt 203 from the steady-state-load calculation value output from the steady-state-load calculation unit 10; and output the tension-variation analysis value on the basis of the estimated installation tension.

In the second embodiment, the first steady-state-load reference value stored in the first steady-state-load reference-value storage unit 11a is a value of a steady-state load observed when the installation tension of the belt 203 is normal, and the first tension reference value stored in the first tension reference-value storage unit 13a, is installation tension of the belt 203 in the same state. However, the first steady-state-load reference value and the first tension reference value may be a value of a steady-state load and installation tension, respectively, observed when the installation tension of the belt 203 is anomalous or a value of a steady-state load and installation tension, respectively, observed when the installation tension of the belt 203 corresponds to an anomaly threshold value.

In the second embodiment, the value of the torque generated by the electric motor 3 is obtained from the drive-current detection value output from the drive-current detection unit 7. However, the value of the torque generated by the electric motor 3 may be calculated using the current command value output from the control computation unit 5, in place of the drive-current detection value.

In the second embodiment, the drive detector 4 detects the angle of the electric motor 3 and outputs the drive detection signal. However, the drive detector 4 may detect the angular velocity or the angular acceleration of the electric motor 3, in place of the angle of the electric motor 3, and output the drive detection signal. Furthermore, the angle, the angular velocity, or the angular acceleration of the small pulley 201 or the large pulley 202 may be detected to output the drive detection signal.

Third Embodiment

Figure 6:
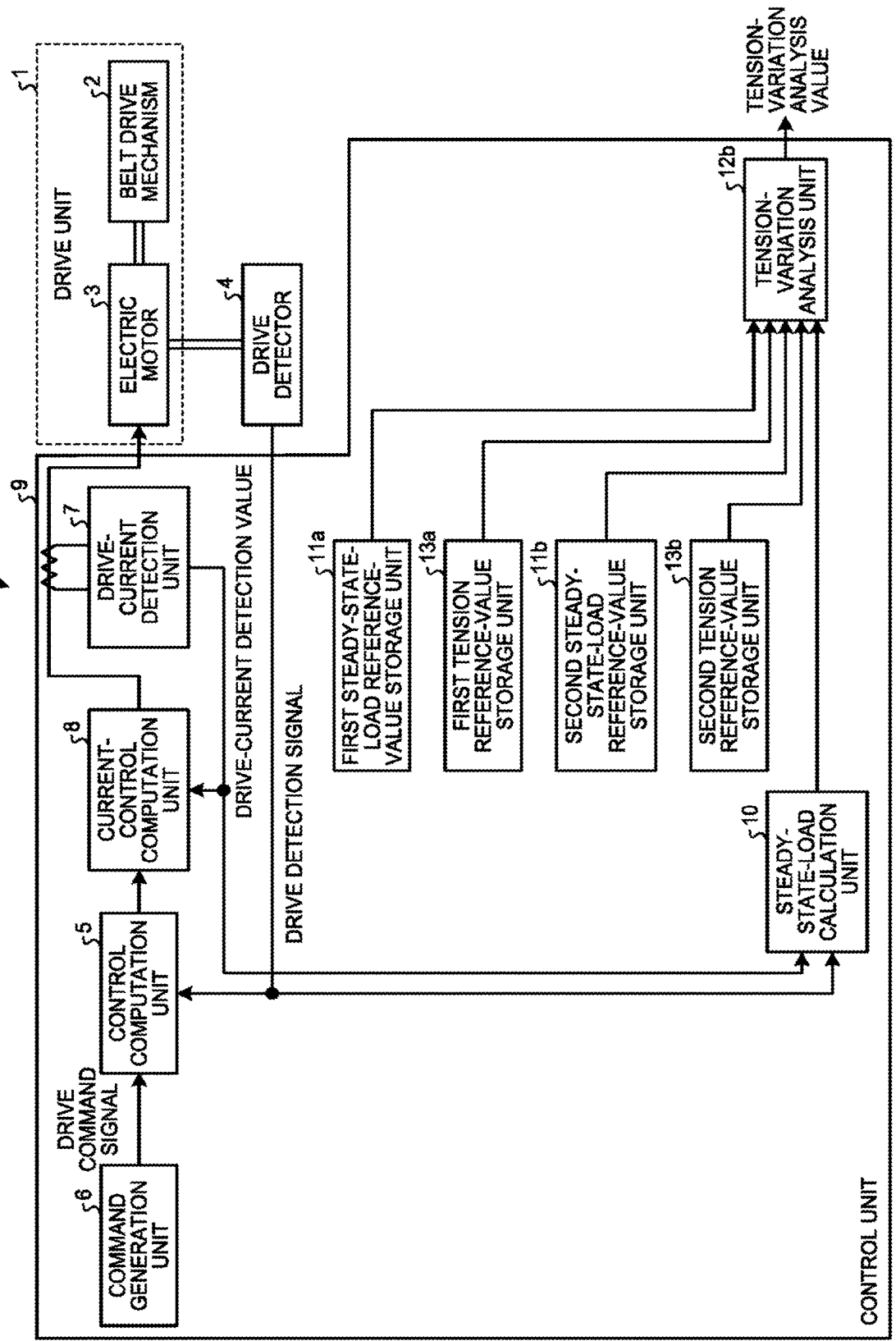
FIG. 6 is a block diagram illustrating a configuration of an electric-motor control apparatus according to a third embodiment of the present invention.

FIG. 6 is a block diagram illustrating a configuration of an electric-motor control apparatus according to a third embodiment of the present invention. An electric-motor control apparatus 53 according to the third embodiment is different from the electric-motor control apparatus 52 according to the second embodiment illustrated in FIG. 5 in that the control unit 9 includes a second steady-state-load reference-value storage unit 11b and a second tension reference-value storage unit 13b, and a tension-variation analysis unit 12b and that the control unit 9 does not include the tension-variation analysis unit 12a. The other elements are similar to those in the second embodiment and are thus designated with identical symbols, and their description is omitted.

A second steady-state-load reference value stored in the second steady-state-load reference-value storage unit 11*b* is a value of a steady-state load with respect to installation tension that is different from that corresponding to the first steady-state-load reference value. A second tension reference value stored in advance in the second tension reference-value storage unit 13*b* is a value of installation tension of the belt 203 that corresponds to the second steady-state-load reference value.

The tension-variation analysis unit 12*b* receives the first steady-state-load reference value, the second steady-state-load reference value, the first tension reference value, the second tension reference value, and the steady-state-load calculation value output from the steady-state-load calculation unit 10. The tension-variation analysis unit 12*b*: calculates current installation tension of the belt 203 from the steady-state-load calculation value, using relationships between the first steady-state-load reference value and the first tension reference value and between the second steady-state-load reference value and the second tension reference value; and outputs a tension-variation analysis value based on a value of the calculated installation tension.

The tension-variation analysis unit 12*b* calculates a coefficient and a constant term of a linear expression that expresses a relationship between the steady-state load and the installation tension of the belt 203 from the two relationships: between the first steady-state-load reference value and the first tension reference value; and between the second steady-state-load reference value and the second tension reference value. By using and calculating the linear expression that expresses a relationship between the steady-state load and the installation tension of the belt 203 in this manner, current installation tension of the belt 203 can be calculated from the steady-state-load calculation value, which is output from the steady-state-load calculation unit 10, even when the installation tension of the belt 203 is zero and the corresponding steady-state-load calculation value is not zero. In other words, the current installation tension of the belt 203 can be calculated even when the torque with respect to the coulomb friction, which is caused in the drive unit 1 in FIG. 4 regardless of the installation tension, is considerably large. The tension-variation analysis value output from the tension-variation analysis unit 12*b* may be: the calculated installation tension; the proportion of a variation of the installation tension that is calculated from normal installation tension; or the presence of an anomaly determined from a comparison between the tension-variation analysis value and installation tension that serves as a preset threshold value.

As described above, the tension-variation analysis unit 12*b* calculates installation tension of the belt 203 that corresponds to the steady-state-load calculation value output from the steady-state-load calculation unit 10. The tension-variation analysis unit 12*b* calculates the installation tension of the belt 203 from: a linear expression calculated from the first steady-state-load reference value stored in the first steady-state-load reference-value storage unit 11*a*; and the second steady-state-load reference value stored in the second steady-state-load reference-value storage unit 11*b*; the first tension reference value stored in the first tension reference-value storage unit 13*a*; and the second tension reference value stored in the second tension reference-value storage unit 13*b* and the tension-variation analysis unit 12*b* outputs the tension-variation analysis value, which is a value that indicates a state of the installation tension of the belt 203. When an effect of a force other than the installation tension of the belt 203 on the drive unit 1, particularly an effect of the friction independent of the velocity on the drive unit 1, is considerable, this configuration allows accurate understanding of the installation tension of the belt 203 by eliminating the effect.

In the third embodiment, the control unit 9 includes two steady-state-load reference-value storage units and two tension reference-value storage units, namely, the first steady-state-load reference-value storage unit 11*a* and the first tension reference-value storage unit 13*a*, and the second steady-state-load reference-value storage unit 11*b* and the second tension reference-value storage unit 13*b*, however the control unit 9 may include three or more steady-state-load reference-value storage units and three or more tension reference-value storage units may. In this case, the tension-variation analysis unit 12*b* estimates current installation tension of the belt 203 from the steady-state-load calculation value, using a relationship between a steady-state-load reference value output from each of the steady-state-load reference-value storage units and a tension reference value output from each of the tension reference-value storage units. In this case, a relation between the steady-state load and the installation tension of the belt 203 that is calculated by the tension-variation analysis unit 12*b* may be a quadratic or greater relation.

In the third embodiment, the value of the torque generated by the electric motor 3 is obtained from the drive-current detection value output from the drive-current detection unit 7, however the value of the torque generated by the electric motor 3 may be calculated using the current command value output from the control computation unit 5 in place of the drive-current detection value.

In the third embodiment, the drive detector 4 detects the angle of the electric motor 3 and outputs the drive detection signal, the drive detector 4 may detect the angular velocity or the angular acceleration of the electric motor 3, in place of the angle of the electric motor 3, and output the drive detection signal. Furthermore, the angle, the angular velocity, or the angular acceleration of the small pulley 201 or the large pulley 202 may be detected to output the drive detection signal.

Fourth Embodiment

Figure 7:
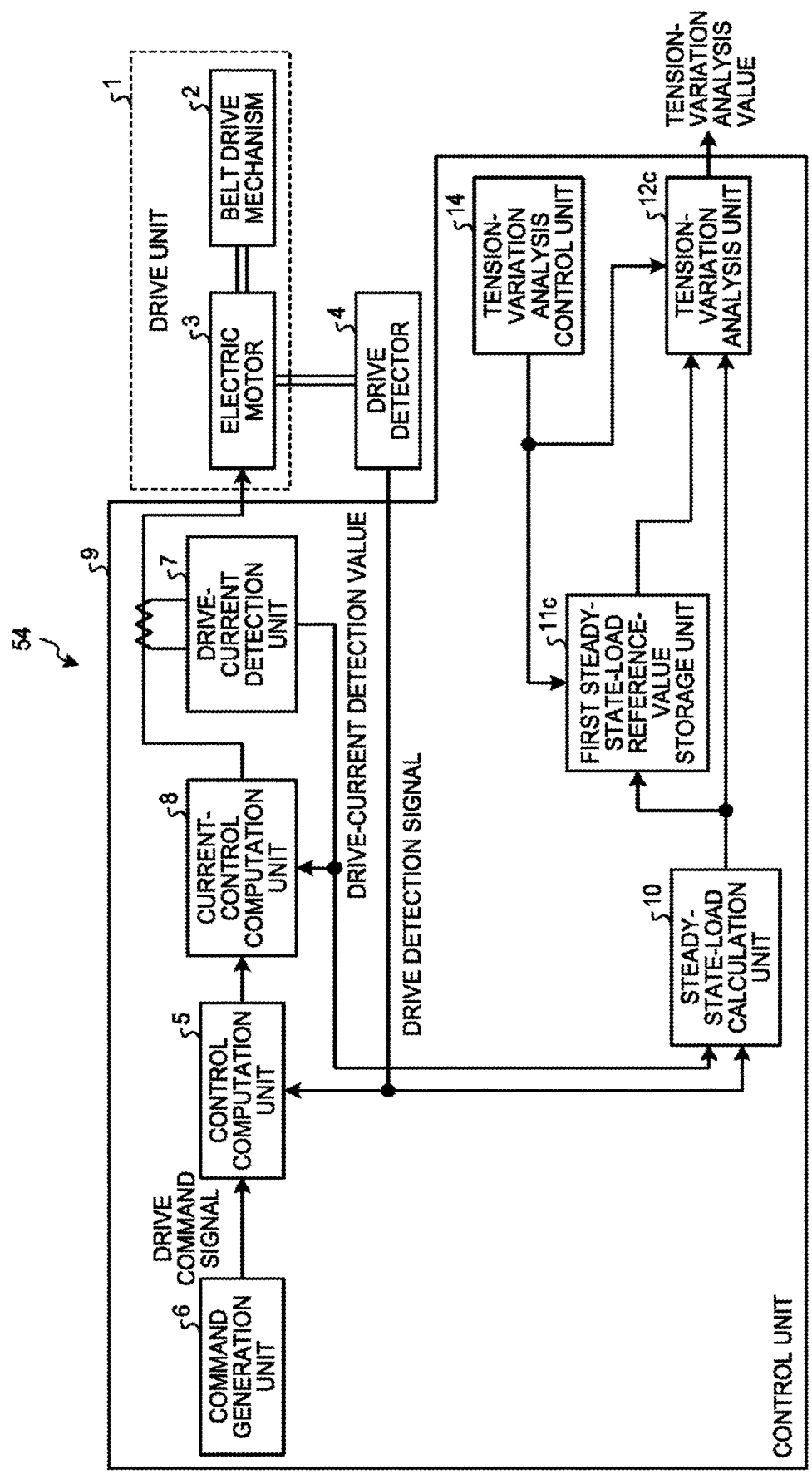
FIG. 7 is a block diagram illustrating a configuration of an electric-motor control apparatus according to a fourth embodiment of the present invention.

FIG. 7 is a block diagram illustrating a configuration of an electric-motor control apparatus according to a fourth embodiment of the present invention. An electric-motor control apparatus 54 according to the fourth embodiment is different from the electric-motor control apparatus 51 according to the first embodiment illustrated in FIG. 1 in that the control unit 9 includes: a tension-variation analysis control unit 14; a first steady-state-load reference-value storage unit 11*c*; and a tension-variation analysis unit 12*c*, and that the control unit 9 does not include: the first steady-state-load reference-value storage unit 11*a*; and the tension-variation analysis unit 12. The other elements are similar to those in the first embodiment and are thus designated with identical symbols, and their description is omitted.

A tension-variation analysis control signal output from the tension-variation analysis control unit 14 indicates initially a time period during which the first steady-state-load reference value is stored and, however after a certain length of time, the tension-variation analysis control signal indicates a time period during which a tension variation is analyzed.

The first steady-state-load reference-value storage unit 11c receives: the steady-state-load calculation value output from the steady-state-load calculation unit 10; and the tension-variation analysis control signal. In a time period in which the tension-variation analysis control signal that indicates the time period during which the first steady-state-load reference value is stored is being received, the first steady-state-load reference-value storage unit 11c computes the first steady-state-load reference value from the received steady-state-load calculation value. The first steady-state-load reference-value storage unit 11c then stops the computation processing, retains a value, and outputs the stored steady-state-load reference value in a time period in which the tension-variation analysis control signal that indicates the time period during which a tension variation is analyzed is being received.

The tension-variation analysis unit 12c receives: the steady-state-load calculation value output from the steady-state-load calculation unit 10; the first steady-state-load reference value; and the tension-variation analysis control signal. In the time period in which the tension-variation analysis control signal that indicates the time period during which the tension variation is analyzed is being received, the tension-variation analysis unit 12c: calculates a variation of the current steady-state-load calculation value, which is output from the steady-state-load calculation unit 10, with respect to the first steady-state-load reference value; and outputs the tension-variation analysis value, which is a result of the calculation.

A flow of an operation of the electric-motor control apparatus 54 will be described next. The tension-variation analysis control unit 14 first outputs the tension-variation analysis control signal that indicates the time period during which the first steady-state-load reference value is stored. The first steady-state-load reference-value storage unit 11c stores the first steady-state-load reference value, which is a value calculated by performing computation processing such as averaging on the steady-state-load calculation value output from the steady-state-load calculation unit 10, in the time period during which the first steady-state-load reference value is stored. A duration of approximately from two or three hours to about a day, in which the installation tension of the belt 203 hardly changes, is appropriate as the time period during which the first steady-state-load reference value is stored.

The tension-variation analysis control unit 14 then outputs the tension-variation analysis control signal that indicates the time period during which a tension variation is analyzed. The first steady-state-load reference-value storage unit 11c stops the calculation of the first steady-state-load reference value and retains and outputs a value of the first steady-state-load reference value in the time period during which a tension variation is analyzed. In the time period during which a tension variation is analyzed, the tension-variation analysis unit 12c: calculates a variation of the current steady-state-load calculation value output from the steady-state-load calculation unit 10, with respect to the first steady-state-load reference value output from the first steady-state-load reference-value storage unit 11c; and outputs the tension-variation analysis value, which is a result of the calculation.

As described above, the tension-variation analysis control unit 14 sets: the time period during which the first steady-state-load reference value is stored; and the time period during which the tension variation is analyzed, thus the first steady-state-load reference-value storage unit 11c calculates the first steady-state-load reference value based on the steady-state-load calculation value output from the steady-state-load calculation unit 10, in the time period during which the first steady-state-load reference value is stored. The need to store the first steady-state-load reference value in the first steady-state-load reference-value storage unit 11c in advance is thus eliminated. The tension-variation analysis unit 12c calculates the tension-variation analysis value indicating a state of the installation tension of the belt 203 after the time period during which the first steady-state-load reference value is stored, thus allowing a user to understand the state of the installation tension of the belt 203 more easily.

In the fourth embodiment, a configuration in which the tension-variation analysis control unit 14 is added to the first embodiment has been described, however a configuration in which the first tension reference-value storage unit 13a is added as in the second embodiment may be possible. In this case, the installation tension of the belt 203 in the belt drive mechanism 2 may be measured during the tension-variation analysis control signal, indicating the time period to store the first steady-state-load reference value, is being output. The first tension reference value being a result of the measurement may be stored in the first tension reference-value storage unit 13a.

In the fourth embodiment, the value of the torque generated by the electric motor 3 is obtained from the drive-current detection value output from the drive-current detection unit 7, however the value of the torque generated by the electric motor 3 may be calculated using the current command value output from the control computation unit 5, in place of the drive-current detection value.

In the fourth embodiment, the drive detector 4 detects the angle of the electric motor 3 and outputs the drive detection signal, however the drive detector 4 may: detect the angular velocity or the angular acceleration of the electric motor 3, in place of the angle of the electric motor 3; and output the drive detection signal.

Furthermore, the angle, the angular velocity, or the angular acceleration of the small pulley 201 or the large pulley 202 may be detected and output as the drive detection signal.

In the fourth embodiment, the tension-variation analysis control unit 14 determines the time period during which the first steady-state-load reference value is stored and the time period during which the tension variation is analyzed on the basis of time, however these time periods may be determined on the basis of the drive detection signal output from the drive detector 4, or the drive command signal output from the command generation unit 6. In this case, an integrated value of the drive detection signal, an integrated value of the drive command signal, or the number of times the signals are output may be calculated and these time periods may be determined on the basis of the calculated value.

Fifth Embodiment

Figure 8:
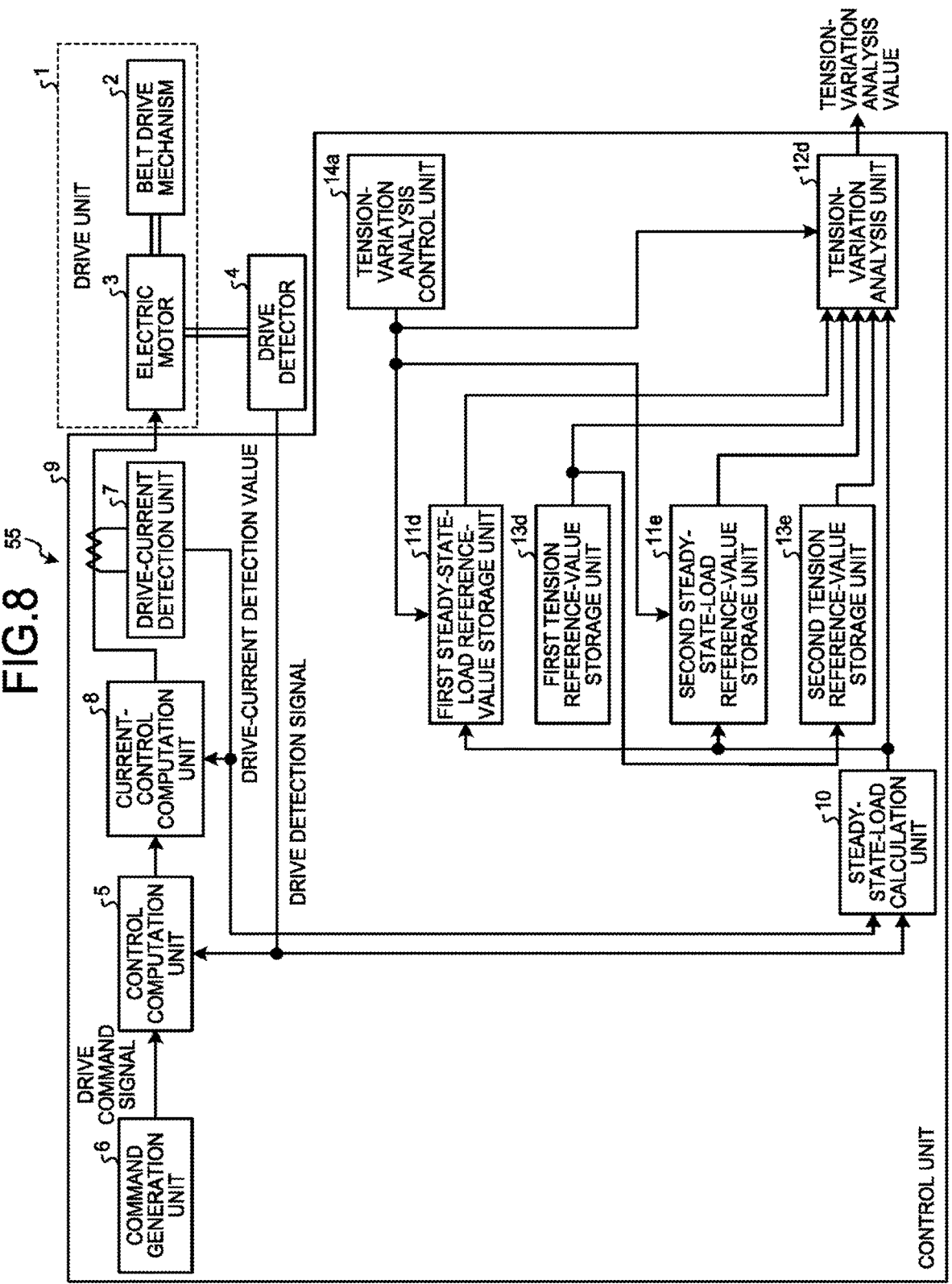
FIG. 8 is a block diagram illustrating a configuration of an electric-motor control apparatus according to a fifth embodiment of the present invention.

FIG. 8 is a block diagram illustrating a configuration of an electric-motor control apparatus according to a fifth embodiment of the present invention. An electric-motor control apparatus 55 according to the fifth embodiment is different from the electric-motor control apparatus 53 according to the third embodiment illustrated in FIG. 6 in that the control unit 9 includes: a tension-variation analysis control unit 14a; a first steady-state-load reference-value storage unit 11d; a second steady-state-load reference-value storage unit 11e; a first tension reference-value storage unit 13d; a second tension reference-value storage unit 13e; and a tension-variation analysis unit 12d, and that the control unit 9 does not include: the first steady-state-load reference-value storage unit 11a; the second steady-state-load reference-value storage unit 11b; the first tension reference-value storage unit 13a; the second tension reference-value storage unit 13b; and the tension-variation analysis unit 12b. The other elements are similar to those in the third embodiment and are thus designated with identical symbols, and their description is omitted.

The tension-variation analysis control unit 14a initially outputs the tension-variation analysis control signal that indicates the time period during which the first steady-state-load reference value is stored for a certain length of time. After the elapse of a predetermined length of time, the tension-variation analysis control unit 14a outputs the tension-variation analysis control signal that indicates a time period during which the second steady-state-load reference value is stored for a certain length of time. Subsequently, the tension-variation analysis control unit 14a outputs the tension-variation analysis control signal that indicates the time period during which the tension variation is analyzed.

The first steady-state-load reference-value storage unit 11d receives: the steady-state-load calculation value output from the steady-state-load calculation unit 10; and the tension-variation analysis control signal. In the time period in which the tension-variation analysis control signal that indicates the time period during which the first steady-state-load reference value is stored is received, the first steady-state-load reference-value storage unit 11d computes the first steady-state-load reference value from the received steady-state-load calculation value. In a time period other than the time period during which the first steady-state-load reference value is stored, the first steady-state-load reference-value storage unit 11d stops the computation processing, retains a value, and outputs the stored first steady-state-load reference value.

The second steady-state-load reference-value storage unit 11e receives: the steady-state-load calculation value output from the steady-state-load calculation unit 10; and the tension-variation analysis control signal. In the time period in which the tension-variation analysis control signal that indicates the time period during which the second steady-state-load reference value is calculated is received, the second steady-state-load reference-value storage unit 11e computes the second steady-state-load reference value from the steady-state-load calculation value, which has been input. In a time period other than the time period during which the second steady-state-load reference value is calculated, the second steady-state-load reference-value storage unit 11e stops the computation processing, retains a value, and outputs the stored second steady-state-load reference value.

The first tension reference-value storage unit 13d stores in advance the first tension reference value, which is a value of installation tension of the belt 203 that corresponds to the first steady-state-load reference value. The second tension reference-value storage unit 13e: receives the first tension reference value stored in the first tension reference-value storage unit 13d; and stores a value that is a predefined proportion of the first tension reference value as the second tension reference value.

The tension-variation analysis unit 12d receives: the first steady-state-load reference value; the second steady-state-load reference value; the first tension reference value; the second tension reference value; the steady-state-load calculation value; and the tension-variation analysis control signal. In a time period in which the tension-variation analysis control signal that indicates the time period during which the tension variation is analyzed is received, the tension-variation analysis unit 12d: calculates current installation tension of the belt 203 from the steady-state-load calculation value output from the steady-state-load calculation unit 10, using relationships between the first steady-state-load reference value and the first tension reference value and between the second steady-state-load reference value and the second tension reference value; and outputs the tension-variation analysis value based on a value of the calculated current installation tension.

A flow of an operation of the electric-motor control apparatus 55 will be described next. The tension-variation analysis control unit 14a first outputs the tension-variation analysis control signal that indicates the time period during which the first steady-state-load reference value is stored. In the time period during which the first steady-state-load reference value is stored, the first steady-state-load reference-value storage unit 11d stores the first steady-state-load reference value calculated by performing computation processing such as averaging on the steady-state-load calculation value output from the steady-state-load calculation unit 10. A duration of approximately from two or three hours to about a day, in which the installation tension of the belt 203 hardly changes, is appropriate as the time period during which the first steady-state-load reference value is stored.

Then, the tension-variation analysis control unit 14a stops the output of the tension-variation analysis control signal that indicates the time period during which the first steady-state-load reference value is stored; and the first steady-state-load reference-value storage unit 11d stops the calculation of the first steady-state-load reference value and retains a value of the first steady-state-load reference value.

The tension-variation analysis control unit 14a outputs the tension-variation analysis control signal that indicates the time period during which the second steady-state-load reference value is stored after the elapse of about one day to a few days from when the output of the tension-variation analysis control signal that indicates the time period during which the first steady-state-load reference value is stored is stopped. In the time period during which the second steady-state-load reference value is stored, the second steady-state-load reference-value storage unit 11e stores the second steady-state-load reference value being a value calculated by performing computation processing such as averaging on the steady-state-load calculation value output from the steady-state-load calculation unit 10. A duration of approximately from two or three hours to about a month, in which the installation tension of the belt 203 hardly changes, is appropriate as the time period during which the second steady-state-load reference value is stored. When a brand-new belt 203 is installed between the small pulley 201 and the large pulley 202 as illustrated in FIG. 2, the brand-new belt 203 is subjected to initial stretching due to the installation tension, stretching in circumferential length and reducing in installation tension. The installation tension of the belt 203 observed in the time period during which the first steady-state-load reference value is stored is different from that observed in the time period during which the second steady-state-load reference value is stored; and the second steady-state-load reference-value storage unit 11e can calculate the second steady-state-load reference value being a value of a steady-state load with respect to installation tension of the belt 203 that is different from that corresponding to the first steady-state-load reference value.

Here, the second tension reference-value storage unit 13e receives: the first tension reference value stored in the first tension reference-value storage unit 13d; and stores the second tension reference value being a value reduced to a proportion of the first tension reference value defined on the basis of the initial stretching of the belt 203.

After the output of the tension-variation analysis control signal that indicates the time period during which the second steady-state-load reference value is stored is stopped, the tension-variation analysis control unit 14a outputs the tension-variation analysis control signal that indicates the time period during which the tension variation is analyzed. In the time period during which the tension variation is analyzed, the first steady-state-load reference-value storage unit 11d retains and outputs a value of the first steady-state-load reference value; and the second steady-state-load reference-value storage unit 11e stops the calculation of the second steady-state-load reference value, and retains and outputs a value of the second steady-state-load reference value. In the time period during which the tension variation is analyzed, the tension-variation analysis unit 12d: calculates current installation tension of the belt 203 from the steady-state-load calculation value output from the steady-state-load calculation unit 10, using relationships between the first steady-state-load reference value and the first tension reference value and between the second steady-state-load reference value and the second tension reference value; and outputs the tension-variation analysis value based on a value of the calculated installation tension. The tension-variation analysis value can be a value of estimated installation tension, an amount of change of estimated installation tension with respect to normal installation tension of the belt 203, or a value that indicates presence of an anomaly determined from a comparison between an estimated installation tension and a preset threshold value, however these are not limitations.

As described above, the tension-variation analysis control unit 14a sets: the time period during which the first steady-state-load reference value is stored; the time period during which the second steady-state-load reference value is stored; and the time period during which the tension variation is analyzed, the first steady-state-load reference-value storage unit 11d and the second steady-state-load reference-value storage unit 11e can calculate and store the first steady-state-load reference value and the second steady-state-load reference value, respectively based on the steady-state-load calculation value output from the steady-state-load calculation unit 10, in such a manner that the first steady-state-load reference value and the second steady-state-load reference value correspond to different installation tension of the belt 203. The need to store the steady-state-load reference values in the first steady-state-load reference-value storage unit 11d and the second steady-state-load reference-value storage unit 11e in advance is thus eliminated. The tension-variation analysis unit 12d calculates the tension-variation analysis value indicating a state of the installation tension of the belt 203 after the time period during which the second steady-state-load reference value is stored, thus a user can understand the state of the installation tension of the belt 203 more easily. When an effect other than the installation tension of the belt 203, particularly an effect of the friction independent of the velocity, is considerable on the drive unit 1, this configuration allows accurate understanding of the installation tension of the belt 203 by eliminating the effect, as in the case with the electric-motor control apparatus 53 according to the third embodiment.

In the fifth embodiment, two steady-state-load reference-value storage units and two tension reference-value storage units, namely, the first steady-state-load reference-value storage unit 11d and the first tension reference-value storage unit 13d, and the second steady-state-load reference-value storage unit 11e and the second tension reference-value storage unit 13e, are included, however three or more steady-state-load reference-value storage units and three or more tension reference-value storage units may be included. In this case, the tension-variation analysis control unit 14a sets a time period during which a steady-state-load reference value is calculated in each of the steady-state-load reference-value storage units. The tension-variation analysis unit 12d estimates the current installation tension of the belt 203 from the steady-state-load calculation value, using a relationship between a steady-state-load reference value output from each of the steady-state-load reference-value storage units and a tension reference value output from each of the tension reference-value storage units.

In the fifth embodiment, the value of the torque generated by the electric motor 3 is obtained from the drive-current detection value output from the drive-current detection unit 7, however the value of the torque generated by the electric motor 3 may be calculated using the current command value output from the control computation unit 5, in place of the drive-current detection value.

In the fifth embodiment, the drive detector 4 detects the angle of the electric motor 3 and outputs the drive detection signal, however the drive detector 4 may detect the angular velocity or the angular acceleration of the electric motor 3, in place of the angle of the electric motor 3, and output the drive detection signal.

Furthermore, the angle, the angular velocity, or the angular acceleration of the small pulley 201 or the large pulley 202 may be detected to output the drive detection signal.

In the fifth embodiment, the tension-variation analysis control unit 14a determines the time period during which the first steady-state-load reference value is stored, the time period during which the second steady-state-load reference value is stored, and the time period during which the tension variation is analyzed on the basis of time, however these time periods may be determined on the basis of the drive detection signal output from the drive detector 4, or the drive command signal output from the command generation unit 6. In this case, an integrated value of the drive detection signal, an integrated value of the drive command signal, or the number of times one of the signals is output may be calculated; and the time period during which the first steady-state-load reference value is stored, the time period during which the second steady-state-load reference value is stored, and the time period during which the tension variation is analyzed may be determined on the basis of the calculated value.

Sixth Embodiment

Figure 9:
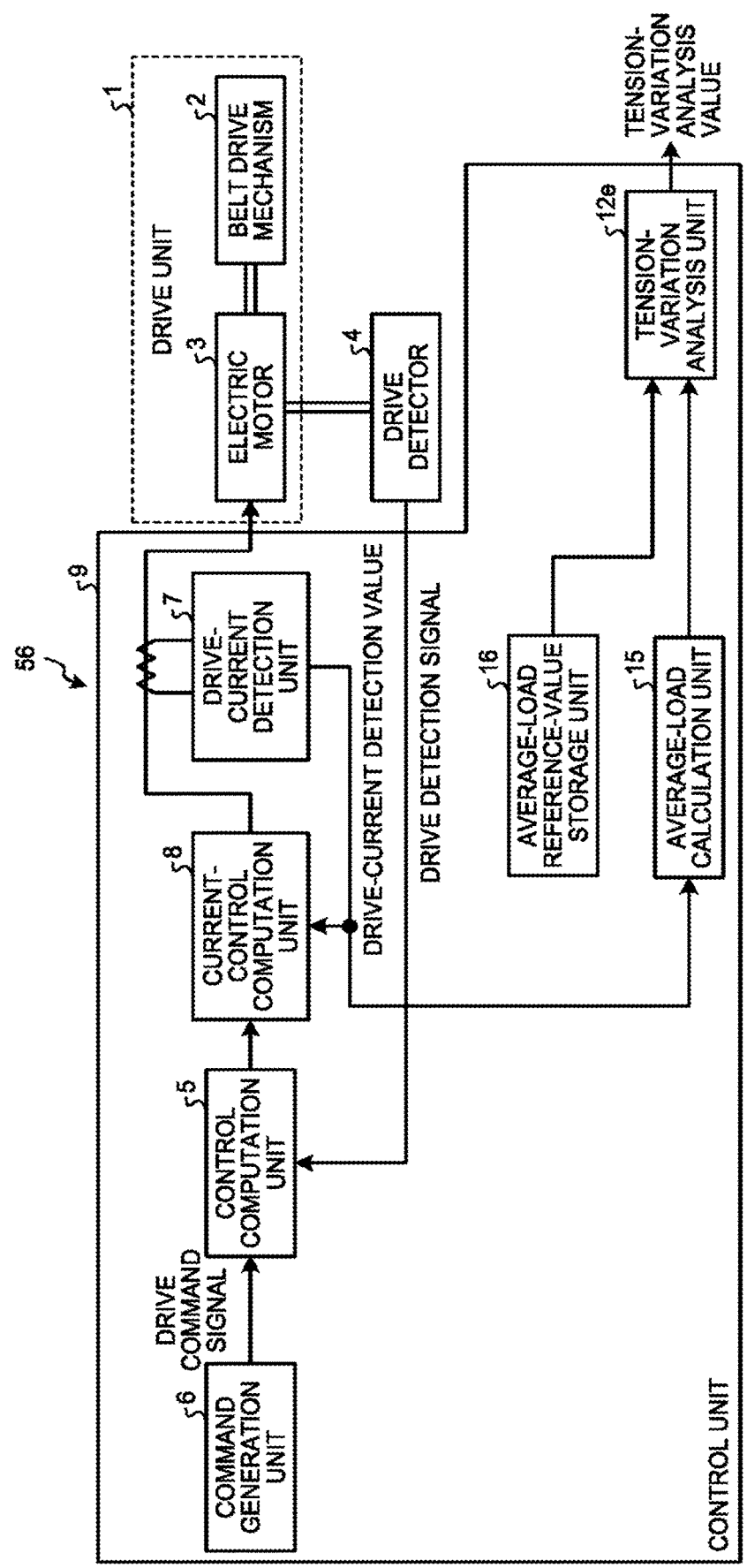
FIG. 9 is a block diagram illustrating a configuration of an electric-motor control apparatus according to a sixth embodiment of the present invention.

FIG. 9 is a block diagram illustrating a configuration of an electric-motor control apparatus according to a sixth embodiment of the present invention. An electric-motor control apparatus 56 according to the sixth embodiment is different from the electric-motor control apparatus 51 according to the first embodiment illustrated in FIG. 1 in that the control unit 9 includes: an average-load calculation unit 15; an average-load reference-value storage unit 16; and a tension-variation analysis unit 12e, and that the control unit 9 does not include: the steady-state-load calculation unit 10; the first steady-state-load reference-value storage unit 11a; and the tension-variation analysis unit 12. The other elements are similar to those in the first embodiment and are thus designated with identical symbols, and their description is omitted.

The average-load calculation unit 15: receives the drive-current detection value output from the drive-current detection unit 7; calculates an average load; and outputs an average-load calculation value that is a result of the calculation. An average-load reference value stored in the average-load reference-value storage unit 16 is a value of an average load in a certain state. The tension-variation analysis unit 12e outputs a tension-variation analysis value that is a value based on a comparison between the average-load calculation value and the average-load reference value.

The average-load calculation unit 15 calculates the average-load calculation value being an average value of a load generated in the electric motor 3 based on an average value of the drive-current detection value. When the drive command signal output from the command generation unit 6, is a repetition of an identical pattern, the average-load calculation value does not change as long as there is no change in the state of the drive unit 1. While a friction component included in the average-load calculation value is cancelled when the drive command signal includes velocities in both positive and negative directions, the average-load calculation value includes a component ascribable to friction when the drive command signal includes a velocity in only one direction. In this case also, the average-load calculation value does not change as long as there is no change in the state of the drive unit 1 including the friction.

As described in the first embodiment, the magnitude of friction caused in the drive unit 1 changes due to a change in installation tension of the belt 203 in the belt drive mechanism 2. When the magnitude of the friction changes, the average-load calculation value calculated by the average-load calculation unit 15, also changes; thus, a change in installation tension of the belt 203 can be roughly understood from the change of the average-load calculation value.

The average-load reference value, which is an average value of a load at a point in time when the installation tension of the belt 203 can be determined as normal such as when the installation tension of the belt 203 has just been adjusted appropriately, is preset in the average-load reference-value storage unit 16. The tension-variation analysis unit 12e calculates a variation of the average-load calculation value with respect to the average-load reference value from: the average-load reference value stored in the average-load reference-value storage unit 16; and the average-load calculation value output from the average-load calculation unit 15, and the tension-variation analysis unit 12e outputs the tension-variation analysis value. When there is no change other than the installation tension of the belt 203 in the drive unit 1, varying of the installation tension of the belt 203 can be understood from a change of the average-load calculation value with respect to the average-load reference value. While the tension-variation analysis value may be a proportion of a variation of the average-load calculation value from a normal state or a value that indicates the presence of an anomaly on the basis of a comparison between a preset threshold value and a magnitude of a variation, however these are not limitations.

As described above, the average-load calculation unit 15 calculates an average value of the load that includes an effect of the friction generated due to the installation tension of the belt 203 and outputs the average-load calculation value. The tension-variation analysis unit 12e can: calculate a variation of the average-load calculation value with respect to a normal state from the average-load reference value stored in the average-load reference-value storage unit 16, and the average-load calculation value; and output the tension-variation analysis value that indicates a state of the installation tension of the belt 203.

In the sixth embodiment, the average-load reference value stored in the average-load reference-value storage unit 16, is an average value of the load observed when the installation tension of the belt 203 is normal, however the average-load reference value may be an average value of the load observed when the installation tension of the belt 203 is anomalous or an average value of the load observed when the installation tension of the belt 203 corresponds to an anomaly threshold value. In this case, the tension-variation analysis unit 12e determines whether an average value of the load output from the average-load calculation unit 15 is anomalous with respect to the steady-state-load reference value and outputs the tension-variation analysis value.

In the sixth embodiment, the value of the torque generated by the electric motor 3 is obtained from the drive-current detection value output from the drive-current detection unit 7, however the value of the torque generated by the electric motor 3 may be calculated using the current command value output from the control computation unit 5, in place of the drive-current detection value.

In the sixth embodiment, the drive detector 4 detects the angle of the electric motor 3 and outputs the drive detection signal, however the drive detector 4 may detect the angular velocity or the angular acceleration of the electric motor 3, in place of the angle of the electric motor 3, and output the drive detection signal.

Furthermore, the drive detection signal may be a detection result of the angle, the angular velocity, or the angular acceleration of the small pulley 201 or the large pulley 202.

A function of the control unit 9 of each of the electric-motor control apparatuses 51, 52, 53, 54, 55, and 56 in the first, second, third, fourth, fifth, and sixth embodiments described above+ is achieved using a processing circuit. That is, the control unit 9 includes a processing circuit that performs: processing to output the drive command signal, which indicates a desired value of an angle, an angular acceleration, or an angular velocity of the electric motor 3; processing to output the current command value, which is a desired value of a magnitude of a drive current to be supplied to the electric motor 3; processing to output the drive-current detection value, which is a measurement value of a magnitude of the drive current; processing to output the drive current to the electric motor 3; processing to output the steady-state-load calculation value, which indicates a magnitude of a steady-state load applied to the electric motor 3; processing to store the first steady-state-load reference value, which is a reference value of the steady-state load applied to the electric motor 3; processing to output the tension-variation analysis value, which indicates a state of installation tension of the belt 203; processing to store the second steady-state-load reference value; the processing to store the first tension reference value; and processing to store the second tension reference value. The processing circuit may be dedicated hardware or an arithmetic unit that performs a program stored in a storage device.

Figure 10:
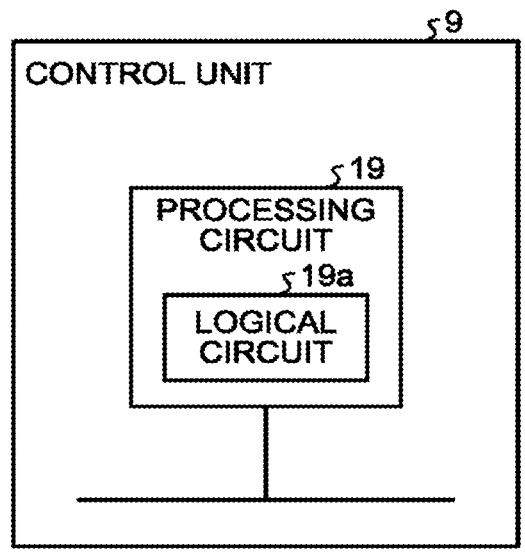
FIG. 10 is a diagram illustrating a configuration in which a function of a control unit of each of the electric-motor control apparatuses according to the first, second, third, fourth, fifth, and sixth embodiments is achieved using hardware.

When the processing circuit is dedicated hardware, the processing circuit may be: a single circuit; a compound circuit; a programmed processor; a parallel programmed processor; an integrated circuit for use in particular applications; a field programmable gate array; or a combination of them. FIG. 10 is a diagram illustrating a configuration in which a function of the control unit 9 of each of the electric-motor control apparatuses 51, 52, 53, 54, 55, and 56 according to the first, second, third, fifth, and sixth embodiments is achieved using hardware. A processing circuit 19 includes a logical circuit 19a that achieves: the processing to output the drive command signal, which indicates a desired value of an angle, an angular acceleration, or an angular velocity of the electric motor 3; the processing to output the current command value, which is a desired value of a magnitude of a drive current to be supplied to the electric motor 3; the processing to output the drive-current detection value, which is a measurement value of a magnitude of the drive current; the processing to output the drive current to the electric motor 3; the processing to output the steady-state-load calculation value, which indicates a magnitude of a steady-state load applied to the electric motor 3; the processing to store the first steady-state-load reference value, which is a reference value of the steady-state load applied to the electric motor 3; the processing to output the tension-variation analysis value, which indicates a state of installation tension of the belt 203; the processing to store the second steady-state-load reference value; the processing to store the first tension reference value; and the processing to store the second tension reference value.

When the processing circuit 19 is an arithmetic unit: the processing to output the drive command signal, which indicates a desired value of an angle, an angular acceleration, or an angular velocity of the electric motor 3; the processing to output the current command value, which is a desired value of a magnitude of a drive current to be supplied to the electric motor 3; the processing to output the drive-current detection value, which is a measurement value of a magnitude of the drive current, the processing to output the drive current to the electric motor 3; the processing to output the steady-state-load calculation value, which indicates a magnitude of a steady-state load applied to the electric motor 3; the processing to store the first steady-state-load reference value, which is a reference value of the steady-state load applied to the electric motor 3; the processing to output the tension-variation analysis value, which indicates a state of installation tension of the belt 203; the processing to store the second steady-state-load reference value; the processing to store the first tension reference value; and the processing to store the second tension reference value are achieved using software, firmware, or a combination of software and firmware.

Figure 11:
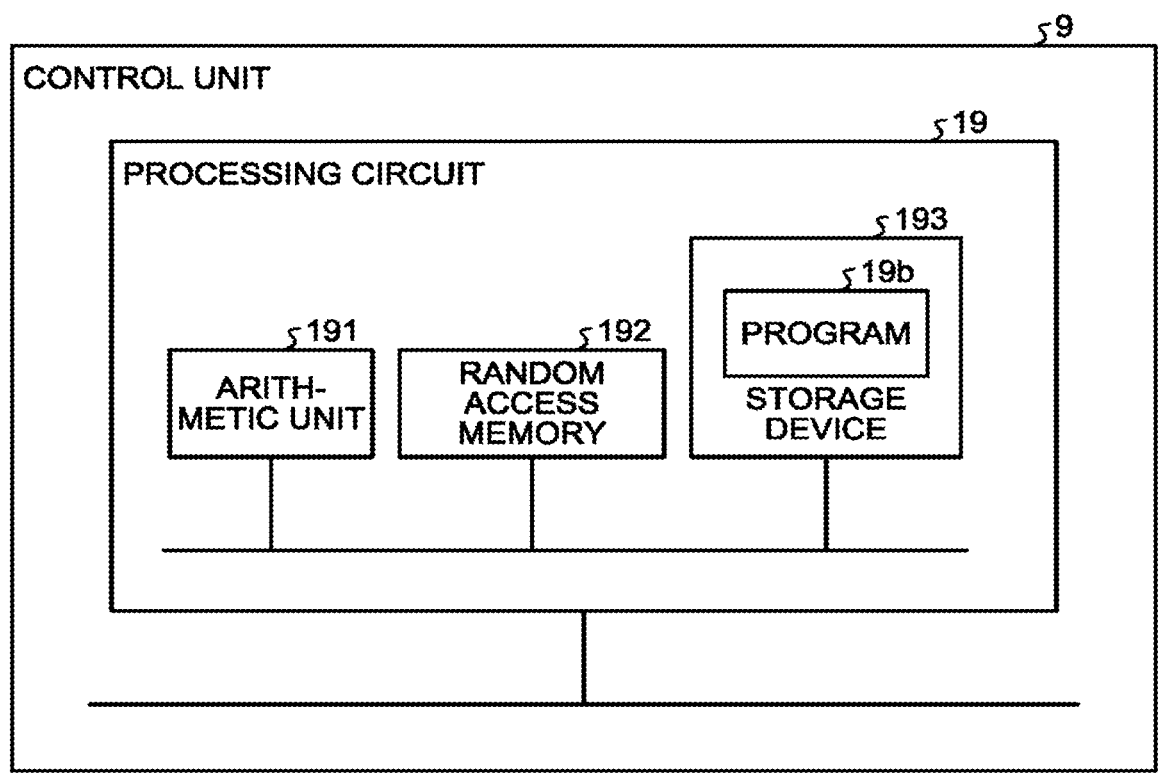
FIG. 11 is a diagram illustrating a configuration in which a function of the control unit of each of the electric-motor control apparatuses according to the first, second, third, fourth, fifth, and sixth embodiments is achieved using software.

FIG. 11 is a diagram illustrating a configuration in which a function of the control unit 9 of each of the electric-motor control apparatuses 51, 52, 53, 54, 55, and 56 according to the first, second, third, fourth, fifth, and sixth embodiments is achieved using software. The processing circuit 19 includes: an arithmetic unit 191 that executes a program 19b; a random access memory 192 that the arithmetic unit 191 uses as a work area; and a storage device 193 that stores the program 19b. By the arithmetic unit 191 loading the program 19b stored in the storage device 193 onto the random access memory 192 and executing the program 19b: the processing to output the drive command signal, which indicates a desired value of an angle, an angular acceleration, or an angular velocity of the electric motor 3; the processing to output the current command value, which is a desired value of a magnitude of a drive current to be supplied to the electric motor 3; the processing to output the drive-current detection value, which is a measurement value of a magnitude of the drive current, the processing to output the drive current to the electric motor 3; the processing to output the steady-state-load calculation value, which indicates a magnitude of a steady-state load applied to the electric motor 3; the processing to store the first steady-state-load reference value, which is a reference value of the steady-state load applied to the electric motor 3; the processing to output the tension-variation analysis value, which indicates a state of installation tension of the belt 203, the processing to store the second steady-state-load reference value; the processing to store the first tension reference value; and the processing to store the second tension reference value are achieved. The software or firmware is described in a program language and stored in the storage device 193. The first steady-state-load reference value, the first tension reference value, and the second steady-state-load reference value are stored in the storage device 193.

The processing circuit 19 achieves each processing by reading out and executing the program 19b, which is stored in the storage device 193. That is, the electric-motor control apparatus includes the storage device 193 for storing the program 19b that, when executed by the processing circuit 19, results in execution of: a step of outputting the drive command signal, which indicates a desired value of an angle, an angular acceleration, or an angular velocity of the electric motor 3; a step of outputting the current command value, which is a desired value of a magnitude of a drive current to be supplied to the electric motor 3; a step of outputting the drive-current detection value, which is a measurement value of a magnitude of the drive current; a step of outputting the drive current to the electric motor 3; a step of outputting the steady-state-load calculation value, which indicates a magnitude of a steady-state load applied to the electric motor 3; a step of storing the first steady-state-load reference value, which is a reference value of the steady-state load applied to the electric motor 3; a step of outputting the tension-variation analysis value, which indicates a state of installation tension of the belt 203; a step of storing the second steady-state-load reference value; a step of storing the first tension reference value; and a step of storing the second tension reference value. It can be also said that the program 19b causes a computer to execute the procedure and the method described above.

A part of: the processing to output the drive command signal, which indicates a desired value of an angle, an angular acceleration, or an angular velocity of the electric motor 3; the processing to output the current command value, which is a desired value of a magnitude of a drive current to be supplied to the electric motor 3; the processing to output the drive-current detection value, which is a measurement value of a magnitude of the drive current; the processing to output the drive current to the electric motor 3; the processing to output the steady-state-load calculation value, which indicates a magnitude of a steady-state load applied to the electric motor 3; the processing to store the first steady-state-load reference value, which is a reference value of the steady-state load applied to the electric motor 3; the processing to output the tension-variation analysis value, which indicates a state of installation tension of the belt 203; the processing to store the second steady-state-load reference value; the processing to store the first tension reference value; and the processing to store the second tension reference value may be achieved using dedicated hardware and another part may be achieved using software or firmware.

As described above, the processing circuit 19 can achieve each of the functions described above using hardware, software, firmware, or a combination of them.

The configurations in the embodiments described above represent some examples of the present invention, and they can be combined with another publicly known technique and partially omitted or modified without departing from the spirit of the present invention.

REFERENCE SIGNS LIST 1 drive unit; 2 belt drive mechanism; 3 electric motor; 4 drive detector; 5 control computation unit; 6 command generation unit; 7 drive-current detection unit; 8 current-control computation unit; 9 control unit; 10 steady-state-load calculation unit; 11a, 11c, 11d first steady-state-load reference-value storage unit; 11b, 11e second steady-state-load reference-value storage unit; 12, 12a, 12b, 12c, 12d, 12e tension-variation analysis unit; 13a, 13d first tension reference-value storage unit; 13b, 13e second tension reference-value storage unit; 14, 14a tension-variation analysis control unit; 15 average-load calculation unit; 16 average-load reference-value storage unit; 19 processing circuit; 19a logical circuit; 19b program; 51 electric-motor control apparatus; 191 arithmetic unit; 192 random access memory; 193 storage device; 201 small pulley; 202 large pulley; 203 belt.

The invention claimed is:

1. An electric-motor control apparatus to control an electric motor that is a driving source in a driver that transfers torque from the driving source to a load by using a belt, the apparatus comprising:
 a command generator to output a drive command signal that indicates a desired value of an angle, an angular velocity, or an angular acceleration of the electric motor;
 a drive detector to output a drive detection signal that indicates a value of the angle, the angular velocity, or the angular acceleration of the electric motor;
 a control computer to receive the drive detection signal and the drive command signal and output a current command value that is a desired value of a drive current to be supplied to the electric motor;
 a drive-current detector to output a drive-current detection value that is a value of the drive current;
 a current-control computer to receive the current command value and the drive-current detection value and output the drive current to the electric motor;
 a steady-state-load calculator to receive the drive-current detection value or the current command value, and the drive detection signal and output a steady-state-load calculation value that indicates a magnitude of a steady-state load applied to the electric motor;
 a first steady-state-load reference-value storage to store a first steady-state-load reference value that is a reference value of the steady-state load applied to the electric motor; and
 a tension-variation analyzer to output a tension-variation analysis value that indicates a state of installation tension of the belt on a basis of a comparison between the steady-state-load calculation value and the first steady-state-load reference value.

2. The electric-motor control apparatus according to claim 1, wherein the steady-state-load calculator calculates the steady-state-load calculation value by calculating torque generated by the electric motor, acceleration/deceleration torque taken to accelerate/decelerate the driver, and viscous friction torque generated due to viscous friction in the driver on a basis of the drive-current detection value and the drive detection signal and subtracting the acceleration/deceleration torque and the viscous friction torque from the torque generated by the electric motor.

3. The electric-motor control apparatus according to claim 1, further comprising a first tension reference-value storage to store a first tension reference value that is a reference value of the installation tension of the belt,
 wherein the tension-variation analysis value is a value of the installation tension of the belt calculated by the tension-variation analyzer on a basis of a comparison between the first steady-state-load reference value that is associated with the first tension reference value, and the steady-state-load calculation value.

4. The electric-motor control apparatus according to claim 3, further comprising:
 a second steady-state-load reference-value storage to store a second steady-state-load reference value; and
 a second tension reference-value storage to store a second tension reference value,
 wherein the tension-variation analyzer outputs the tension-variation analysis value on a basis of a comparison between a relationship defined using the first steady-state-load reference value that is associated with the first tension reference value and the second steady-state-load reference value that is associated with the second tension reference value, and the steady-state-load calculation value.

5. The electric-motor control apparatus according to claim 4, further comprising a tension-variation analysis controller to output one of a first signal that indicates a time period when the first steady-state-load reference value is calculated, a second signal that indicates a time period when the tension-variation analysis value is calculated, and a third signal that indicates a time period when the second steady-state-load reference value is calculated on a basis of time, the drive command signal, or the drive detection signal,
 wherein the first steady-state-load reference-value storage calculates the first steady-state-load reference value on a basis of the steady-state-load calculation value and stores a result in a time period when the first signal is received, and the second steady-state-load reference-value storage calculates the second steady-state-load reference value on a basis of the steady-state-load calculation value in a time period when the third signal is received, and
 the tension-variation analyzer outputs the tension-variation analysis value in a time period when the second signal is received.

6. The electric-motor control apparatus according to claim 1, further comprising a tension-variation analysis controller to output one of a first signal that indicates a time period when the first steady-state-load reference value is calculated and a second signal that indicates a time period when the tension-variation analysis value is calculated on a basis of time, the drive command signal, or the drive detection signal,
 wherein the first steady-state-load reference-value storage calculates the first steady-state-load reference value on a basis of the steady-state-load calculation value and stores a result in a time period when the first signal is received, and
 the tension-variation analyzer outputs the tension-variation analysis value in a time period when the second signal is received.

7. The electric-motor control apparatus according to claim 1, wherein the first steady-state-load reference value that is stored in the first steady-state-load reference-value storage is a value that indicates a magnitude of a steady-state load applied to the electric motor when the installation tension of the belt is set to a certain value, and the tension-variation analyzer outputs the tension-variation analysis value that indicates an anomaly of the installation tension of the belt when the steady-state-load calculation value is equal to or smaller than the first steady-state-load reference value.

8. An electric-motor control apparatus to control an electric motor that is a driving source in a driver that transfers torque from the driving source to a load by using a belt, the apparatus comprising:

a command generator to output a drive command signal that indicates a desired value of an angle, an angular velocity, or an angular acceleration of the electric motor;

a drive detector to output a drive detection signal that indicates a value of the angle, the angular velocity, or the angular acceleration of the electric motor;

a control computer to receive the drive detection signal and the drive command signal and output a current command value that is a desired value of a magnitude of a drive current to be supplied to the electric motor;

a drive-current detector to output a drive-current detection value that indicates a value of the drive current;

a current-control computer to receive the current command value and the drive-current detection value and output the drive current to the electric motor;

an average-load calculator to receive the drive-current detection value or the current command value and output an average-load calculation value that indicates an average value of a load applied to the electric motor;

an average-load reference-value storage to store an average-load reference value that indicates an average reference value of the load applied to the electric motor; and a tension-variation analyzer to output a tension-variation analysis value that indicates a state of installation tension of the belt on a basis of a comparison between the average-load calculation value and the average-load reference value.

* * * * *